United States Patent [19]
Costello et al.

[11] Patent Number: 4,921,621
[45] Date of Patent: * May 1, 1990

[54] HYDROLYZED CO-POLYMERS OF N-VINYLAMIDE AND ACRYLAMIDE FOR USE AS WATERLOSS CONTROL ADDITIVES IN DRILLING MUD

[75] Inventors: Christine A. Costello, Easton; Robert K. Pinschmidt, Jr., Allentown, both of Pa.; Ta-Wang Lai, Novato, Calif.

[73] Assignee: Air Products and Chemicals, Inc., Allentown, Pa.

[*] Notice: The portion of the term of this patent subsequent to Feb. 14, 2006 has been disclaimed.

[21] Appl. No.: 268,329

[22] Filed: Nov. 7, 1988

Related U.S. Application Data

[63] Continuation-in-part of Ser. No. 164,356, Mar. 4, 1988, Pat. No. 4,804,793, which is a continuation-in-part of Ser. No. 914,046, Oct. 1, 1986, abandoned.

[51] Int. Cl.$^5$ ............................................. C09K 7/00
[52] U.S. Cl. ................................. 252/8.513; 175/65; 252/8.514; 524/445; 524/447; 524/555
[58] Field of Search ................. 524/445, 447, 555; 252/8.55 D, 8.513, 8.514; 175/65

[56] References Cited

U.S. PATENT DOCUMENTS

| | | |
|---|---|---|
| 3,278,506 | 10/1968 | Chamot et al. ............... 260/89.7 |
| 3,730,900 | 5/1973 | Perricone ..................... 252/8.5 C |
| 3,764,530 | 10/1973 | Burland ........................ 262/8.5 C |
| 3,957,739 | 5/1976 | Cabestany et al. ........... 526/207 |
| 4,217,214 | 8/1980 | Dubin ............................ 210/52 |
| 4,444,667 | 4/1984 | Burkert et al. ............... 210/735 |
| 4,476,029 | 10/1984 | Sy .................................. 252/8.5 C |
| 4,500,437 | 2/1985 | Engelhardt ................... 252/8.55 C |
| 4,533,708 | 8/1985 | Costello ........................ 220/6 |
| 4,652,623 | 3/1987 | Chen et al. .................... 526/287 |
| 4,680,128 | 7/1987 | Portnoy ........................ 252/8.511 |
| 4,699,722 | 10/1987 | Dymond et al. .............. 252/8.551 |

FOREIGN PATENT DOCUMENTS 0120592 10/1984 European Pat. Off. .
2152929A 8/1985 United Kingdom .

*Primary Examiner*—Bernard Lipman
*Attorney, Agent, or Firm*—Mark L. Rodgers; William F. Marsh; James C. Simmons

[57] ABSTRACT

Aqueous, clay-based drilling mud compositions are improved with respect to waterloss control by the addition of a hydrolyzed copolymer of acrylamide and an N-vinylamide. The copolymer, which is effective over a broad range of molecular weights, contains at least 5 mol percent of the N-vinylamide monomer moiety of which at least 5 mol percent is hydrolyzed to vinylamine units. Well drilling is improved by circulating through the bore hole a drilling mud containing this waterloss control additive.

14 Claims, No Drawings

4,921,621

HYDROLYZED CO-POLYMERS OF N-VINYLAMIDE AND ACRYLAMIDE FOR USE AS WATERLOSS CONTROL ADDITIVES IN DRILLING MUD

CROSS-REFERENCE TO RELATED APPLICATIONS

This application is a continuation in part of co-pending application Ser. No. 164,356 filed Mar. 4, 1988, now U.S. Pat. No. 4,804,793 which, in turn, is a continuation-in-part of copening application Ser. No. 914,046 filed Oct. 1, 1986 now abandoned.

TECHNICAL FIELD

This invention relates to a drilling mud composition which contains a hydrolyzed copoymer of acrylamide and N-vinylamide as a waterloss control additive. In another aspect, it relates to a method of drilling a well with a cuting bit by circulating through the bottom of the bore hole a drilling mud which contains a hydrolyzed copolymer of acrylamide and N-vinylamide as a waterloss control additive and viscosity modifier.

BACKGROUND OF THE INVENTION

In oil and gas production, wells are drilled using a rotary driling method with the cutting bit attached to a drill stem while drilling mud is circulated to the bottom of the bore hole and back to the surface to remove the cuttings made by the bit. These drilling fluids can be of various types, but the most common fluid has an aqueous base in which colloidal solids are suspended. These solids are special forms of clay, most commonly Wyoming Bentonite or similar types of clay which produce the desired viscosity and thixotropic properties for efficient removal of cuttings from the bore hole.

Some of the most serious problems encountered in producing and maintaining effective clay-based aqueous drilling muds are caused by the interaction of the mud with the earth formation being drilled. These include the possible contamination of the mud by fluids in the earth formation and the incorporation into the mud of viscosity producing inert solids. Also, the drilling mud is heated because of high temperatures in the formation, particularly in wells exceeding 5,000 feet in depth. In addition to such problems, control of the properties of the drilling mud is complicated by loss of water from the drilling fluid to the formation being drilled. If too much water is lost, the downhole formation can be destablized with resultant collapse of the hole.

These problems are even more acute when drilling a formation which has high salinity, or if the mud is contaminated by divalent ions such as calcium and magnesium. In such situations, the clay, especially bentonite, tends to thicken the mud uncontrollably and the drilling fluids tend to lose considerable water to the formation. Also, there is a need to formulate drilling fluidswith sea water for off-shore drilling. To address these problems, various types of polymers have been incorporated in the drilling muds in order to control the viscosity, to stabilize the mud under high temperature conditions and in the presence of various minerals, and to reduce the tendency of the mud to lose water into the formation.

In summary, the most important functions of a drilling fluid are to (1) remove formation cuttings from the bottom of the hole and transport them to the surface, (2) provide sufficient hydrostatic pressure against the formation fluids, (3) stabilize downhole formations and prevent hole collapse, (4) prevent loss of fluid to permeable formations, (5) cool and lubricate the bit and drill string, and (6) help suspend the weight of the drill string casing.

U.S. Pat. No. 3,764,530 (1973) describes a drilling fluid which contains an acrylic acid copolymer which does not contain halogen, but has an average molecular weight of below about 2500. Drilling muds are described which can be prepared from fresh water, brine or salt water and contain suspended solids such as clay bentonite and a chemical dispersant, termed a "thinner". The thinner deflocculates the clay and drilled solids and the acrylic acid polymer is added to reduce thermal degradation.

U.S. Pat. No. 3,730,900 (1973) describes an additive for drilling fluids which is a low molecular weight copolymer of styrene sulfonic acid and maleic anhydride, which is said to stabilize the viscosity characteristics and improve the clay suspension.

U.S. Pat. No. 4,476,029 (1984) discloses the use of polyacrylic acid as a dispersant in water-based bentonite drilling muds which also contain a weighting agent plus a commercial waterloss control additive.

U.S. Pat. No. 4,680,128 (1987) discloses the use of low molecular weight copolymers of acrylic acids and salts of vinylsulfonic acid as a dispersant and deflocculant for stabilizing aqueous clay-based drilling fluids which are subjected to calcium contamination. This additive is also said to help prevent thermal degradation.

U.S. Pat. No. 4,699.722 (1987) discloses the use of polymers such as dimethylaminopropyl methacrylamide as aviscosifer in completion fluids for oil wells, which can include non-damaging drilling fluids. This additive is said to increase viscosity of the fluid while remaining stable at high temperatures.

European Pat. Application, Publication No. 0 120 592 (1984) describes stabilizing fines in permeable subterranean formations with certain organic polycationic polymers containing 2 quarternary ammonium moieties in the polymer repeating unit.

The above described polymer additives may improve mud rheology but not fluid retention.

The problem of loss of water into the formation from drilling muds is addressed by U.S. Pat. No. 4,533,708 (1985) which suggests as a waterloss control additive, copolymers of a carboxylic functional monomer, an acrylamide-type monomer and a cationic-containing monmoer, e.g., acrylic acid, acrylamide and dimethyldiallyl ammonium chloride. U.S. Pat. No. 4,652,623 (1987) also deals with the prevention of fluid loss by using similar copolymers such as those of acrylic acid, 2-acrylamido-2-methyl propyl sulfonic acid, dimethydiallyl ammonium chloride and acrylamide.

The polyacrylamides and copolymers consisting primarily of polyacrylamide have been used as coagulents in various systems such as disclosed in U.S. Pat. No. 3,278,506 (1966). U.S. Pat. No. 3,957,739 (1976) describes the use of inverse emulsion polymerization to form polyacrylamides said to have very high molecular weight useful as flocculation agents. These polymers are shown to reduce the sedimentation time of kaolin.

Polyvinylamine hydrochloride, having a molecular weight of about $3 \times 10^5$ on greater, is described in U.S. Pat. No. 4,217,214 (1980), as effective for use as a flocculating agent in wastewater systems. The addition of the polyvinylamine is said to improve filtration rates.

U.S. Pat. No. 4,444,667 (1984) discloses a homopolymer of N-vinylformamide which has been hydrolyzed so that from 10 to 90% of the formyl groups are converted to amine groups. It is said that this polymer is useful as a flocculant in sludges and increases the size of the particles of solids to be flocculated.

GB 2,152,929 (1985) describes a process for making N-substituted formamides which can be converted to N-vinylformamides, useful as a monomer to prepare polymers which can be hydrolyzed to polyvinylamine. This polymer can then be used for dehydrating organic sludges and improving the filterability or yield of fillers in papermaking.

U.S. Pat. No. 4,500,437 (1985) describes how friction can be reduced in fracture-acidizing an oil or gas well by adding to the acidizing fluid acrylamide copolymers or terpolymers containing N-vinylformamide and N-vinylacetamide. These copolymers can contain from 5 to 50% by weight of N-vinylformamide, 10 to 95% acrylamide and up to 85% of third monomers which can include N-vinylacetamide. The molecular weight of these copolymers can range from 20,000 to $15 \times 10^6$. The statement is made that although hydrolytic degradation occurs on dependent groups of the polymer, the products remain acid soluble and will not precipitate from solution. There is, however, no teaching in regard to hydrolysis of the N-vinylamide groups to vinylamine units. Also, this patent does not address the problem of waterloss control in drilling muds, nor does it suggest the use of hydrolyzed co-polymers as waterloss preventors in clay-based drilling fluids.

SUMMARY OF THE INVENTION

According to the present invention, the loss of water from an aqueous, clay-based drilling mud can be effectively reduced by adding to the mud a copolymer of acrylamide and an N-vinylamide, this copolymer having at least about 5% of its N-vinylamide units originally present hydrolyzed to N-vinylamine units. The drilling of wells, such as in oil and gas production, can thereby be improved by circulating to the bottom of the bore hole, around the cutting bit and back to the surface, an aqueous clay-based drilling mud which contains the hydrolyzed copolymer of acrylamide and N-vinylamide as a waterloss control additive.

DETAILED DESCRIPTION OF THE INVENTION

The waterloss control additive used in aqueous clay-based drilling muds according to the invention is a copolymer of acrylamide and an N-vinylamide wherein the copolymer is at least partially hydrolyzed. The N-vinylamide can be any such monomer which will copolymerize with acrylamide without loss of its amide groups but after polymerization can be hydrolyzed from the polymerized N-vinylamide unit to a vinylamine unit. In other words, a polymer is formed having amine functionality directly on the polymer backbone. For best performance in this invention, however, it is preferred that the N-vinylamide, prior to polymerization, have the formula:

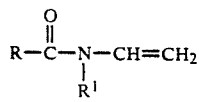

wherein R and $R^1$ are each selected from hydrogen or $C_1$ to $C_4$ alkyl groups. Ideally, the N-vinylamide is N-vinylformamide. When the hydrolyzed copolymer of arylamide and N-vinylformamide is added to a bentonite slurry in brine or sea water, the flocculated clay is redispersed.

The copolymers can be made from various ratios of N-vinylamide and acrylamide using common radical initiated chain growth polymerization techniques. For example, one method involves the use of inverse or water-in-oil emulsion polymerization in which an aqueous solution containing from 10 to 90 wt % of water-soluble N-vinylamide and the acrylamide are colloidally dispersed in a hydrocarbon liquid using a surfactant having an HLB from 4 to 9. The emulsion can contain 10 to 70 wt % of the aqueous solution dispersed in the hydrocarbon, which can be, for example, $C_5$ to $C_{10}$ alkane, toluene or xylene. Contemplated as the functional equivalent of toluene and xylene when R is an alkyl group in the monomer formula are ethylbenzene and tetrahydronaphthalene (tetralin).

The weight ratio of the monomer-containing aqueous solution to hydrocarbon liquid is preferably in the range from 1:2 to 2:1, and polymerizing the monomer takes place using an azo-type free radical initiator. The molecular weight of the polymer made by inverse emulsion polymerization range from medium to very high, typically from about $10^4$ to $10^6$ average molecular weight. Solution rheology (thickening efficiency and viscosity response to shear rates in the range of 1 to 1,000 sec$^{-1}$) of the poly(vinylamines) at a 0.5 to 1% concentration in low level salt solutions, e.g. 2% KCl solution, is important in oil field chemical compositions for many applications. The medium to high molecular weight of the polymers affords better viscosifying and improved rheological properties. The polymer emulsion itself, even though the copolymer has a medium to high molecular weight, exhibits low viscosity ranging from 2 to less than 10 cps at 15% solids, 60 rpm Brookfield and 20° C. The use of this emulsion eliminates problems of solution viscosity which occur when the polymer is prepared by a solution polymerization process. The copolymer emulsion is easy to handle and can be added directly to the drilling mud.

In the inverse emulsion polymerization the stabilizing system comprises suitable emulsifying agents, or surfactants, having a hydrophilic-lipophilic balance (HLB) value from 4 to 9, preferably 4 to 7.5, and include sorbitan fatty acid esters such as sorbitan monostearate, oleate, laurate or palmitte; polyoxyethylene- sorbitan fatty acid esters, i.e. reaction products of one mole of the aforementioned sorbitan fatty acid esters with from 4 to 40 moles of ethylene oxide; polyoxyethylene sorbitol estes of fatty acids; and mixtures thereof. The preferable quantity of surfactant is 5 to 20 wt % based on the monomer-containing aqueous solution.

The free radical initiator should be one of the azo compounds well known in the polymerication art such as 2,2'-azobix(isobutyronitrile); 2,2'-azobis(2-amidinopropane) hydrochloride; 4,4'-azobis(4'-cyanopentanoic acid) and the like. Persulfates and hydrogen peroxide have been found not to be suitable in this polymerization. Redox catalyst systems may also be used comprising peroxy initiators with a reducing agent typically used inthe art. The amount of free radical initiator can be varied widely depending upon reaction temperatures, rate of polymerization, degree of polymerization to be obtained, but preferably is in the range of 0.001 to 0.5 mole % of the monomer used.

The polymerization is usually carried out under an inert atmosphere, preferably under nitrogen. The reaction temperature is preferably in the range of 40–60° C. A high temperature, i.e. >60° C., may cause side reactions unfavorable to the polymer such as crosslinking or chain transfer. A lower temperature may be impractical because of long reaction times.

Other methods of preparing the copolymer involve the same type of radical initiator, but occur in aqueous solution. Additionally, photoinitiated polymerization methods can also be used.

EXAMPLE 1

In order to illustrate methods which can be used to prepare copolymers of acrylamide (AM) and N-vinyl-formamide (NVF), the conditions for three types of polymerization are summarized in Table 1.

TABLE 1

| Polymer | AM (g) | NVF (g) | Initiator (g) | Solvent (g) | Surfactant (g) | Temp (°C.) | Time (hr) |
|---|---|---|---|---|---|---|---|
| A | 65 | 10 | 1.15 (Vazo 52) | 150 (H₂O) +450 (octane) | 12.5 (span 60) | 45 | 4 |
| B | 55 | 20 | 0.81 (Mixxim I-100) | 675 (H₂O) | — | 60 | 4 |
| C | 55 | 20 | 1.62 (Mixxim) I-100) | 1350 (H₂O) | — | 60 | 4 |

Span 60 is sorbitan monostearate, HLB 4.7.
Vazo 52 is 2,2'-azobis (2,4-dimethylpentanenitrile).
Mixxim I-100 is 2,2'-azobis(2-amidinopropane) HCl Polymer A is prepared by the inverse emulsion polymerization method, while polymers B and C are prepared by aqueous solution polymerization. The copolymers are purified by precipitation from acetone and their compositions determined by nuclear magnetic resonance analysis. As little as 8% N-vinylformamide in the copolymer is shown to be effective in obtaining beneficial properties for waterloss control. The molecular weight (MW) of the copolymer can be quite broad, from low to medium to high, for example on the order of less than 100,000 to several 100,000 to over one million as measured by intrinsic viscosity in one molar sodium chloride solution.

Hydrolysis of the copolymers is achieved by dissolving the copolymer in water at elevated temperatures, for example 60° C. to 80° C., adding the desired amount of base, such as sodium hydroxide, and maintaining these conditions for approximately 3 hours. The hydrolyzed copolymer can then be readily precipitated by adding an excess of a nonsolvent and the hydrolyzed copolymer dried in a vacuum oven.

EXAMPLE 2

Experiments were carried out to evaluate polymer such as those described in Example 1 as drilling mud additives using standard American Petroleum Institute (API) procedures. The performance characteristics evaluated for the drilling muds are as follows:

Gel Strength

Gel strength is a measure of the thixotropic properties of a fluid and denotes the force of flocculation under static conditions. Gel strengths of the mud are measured on a Fann Viscometer. The difference between the 10 minute and initial gel indicates the pump pressure needed to start recirculation of the fluid. If this difference is low (referred to as a fragile gel) low pump pressure is needed and fewer problems occur during the drilling operation.

Yield Point and Plastic Viscosity

The yield point in drilling fluids terminology is the resistance to initial flow, or the stress required to start fluid movement. This resistance is due to electrical charges on or near the surface of clay particles suspended in the mud. There is an optimal level of this property, depending on the nature of the mud. The plastic viscosity is a measure of the internal resistance to fluid flow attributable to the concentration, type, shape, and size of solids present. Yield point and plastic viscosity are affected by changes in temperature.

Fluid Loss

Filtration control is facilitated by alignment of bentonite platelets against the well bore. In the laboratory, this is measured by collecting the filtrate from a mud under 100 psi pressure through a 2.5 micron filter. Minimal fluid loss is desirable; in the field, too much fluid loss results in hole collapse. The alignment of bentonite platelets against the walls of the hole is qualitatively described by inspection of the filter paper after the test is done. A dense, thin filter cake is desirable.

Oil Well Drilling Fluid Evaluation

The hydrolyzed copolymer samples were evaluated in 5% KCl and sea salt based muds. For the 5% KCl test, 10 grams of Bentonite clay were slurried in 200 ml of deionized water in a Hamilton Beach milkshake mixer. After 15 minutes, 105 ml of 180 g/l KCl solution was added to the slurry. (This addition causes clay flocculation.) The mud was then mixed for 5 minutes. 50 g of 4% active polymer solution, adjusted to pH 8.5 was added to the slurry and mixed for 15 minutes. "Good" samples show an instantaneous dispersion of the slurry and a noticeable drop in mud viscosity. The mud slurry was removed from the mixer and mud viscosity was determined on a Fann 35A viscometer at 300 and 600 rpm. The slurry was then put in a Baroid Filter Press at 100 psi and the filtrate collected in a graduated cylinder. The following measurements were made to evaluate the mud:

1. Plastic viscosity (PV) = 600 rpm reading − 300 rpm reading.
2. Yield Point (YP) = 300 rpm − PV
3. Gel Strength (GELS) = 3 rpm Fann reading initially/3 rpm reading after 10 min.
4. Filtration (FL) = 30 minute fluid loss from filter press at 100 psi.

The sea water mud was made in the same way as described except 105 ml of a solution of 175 g/liter Instant Ocean Sea Salt ® obtained from Aquarium Systems, Inc. was added in place of the KCl soution above.

The results for the KCl based muds are reported in Table 2 below and the results for the sea salt based round are reported in Table 3 below.

TABLE 2

Performance of Hydrolyzed AM/NVF Copolymers as Drilling Fluid Activities
KCL BASED MUD

| Run | MW | % NVF | % Hydrolysis | PV | YP | gels | 30 min FL |
|---|---|---|---|---|---|---|---|
| 1 | high | 8 | 5 | 5 | 0 | 0/0 | 8.5 |
|  |  |  | 10 | 5 | 0 | 0/0 | 9.5 |
|  |  |  | 50 | 9 | 4 | 0/0 | 9.0 |
|  |  |  | 100 | 4 | 9 | 3/8 | 26.0 |

TABLE 2-continued

Performance of Hydrolyzed AM/NVF Copolymers as Drilling Fluid Activities
KCL BASED MUD

| Run | MW | % NVF | % Hydrolysis | PV | YP | gels | 30 min FL |
|---|---|---|---|---|---|---|---|
| 2 | med. | 19 | 5 | 5 | 6 | 2/9 | 34.0 |
|  |  |  | 10 | 5 | 12 | 4/12 | 36.0 |
|  |  |  | 50 | 6 | 0 | 0/0 | 8.5 |
|  |  |  | 100 | 7 | 13 | 7/14 | 14.0 |
| 3 | low | 22 | 5 | 5 | 5 | 1/8 | 41.0 |
|  |  |  | 10 | 5 | 12 | 4/12 | 9.5 |
|  |  |  | 50 | 5 | 1 | 0/0 | 13.0 |
|  |  |  | 100 | 6 | 0 | 0/0 | 8.0 |
| 4 | No Additive |  |  | 1 | 23 | 11/ | 140.0 |

PV = Plastic Viscosity
YP = Yield Point
gels - Gel Strength (initial/10 minute)
30 min FL = Fluid loss in milliliters after 30 minutes under 100 psi pressure
Percentage values are on a mole basis.

TABLE 3

Drilling Fluid Data for Sea Water Based Mud

| Run # | % NVF in Polymer | % Hydrolysis | PV | YP | gels | fluid loss (30 min.) |
|---|---|---|---|---|---|---|
| 5 | 8 | 50 | 7 | 5 | 1/7 | 6 mls |
| 6 | 19 | 100 | 8 | 10 | 6/11 | 32 |
| 7 | 22 | 100 | 10 | 14 | 7/15 | 26 |
| 8 | 8 | 25 | 4 | 8 | 2/7 | 10 |
|  |  | 75 | 8 | 16 | 9/22 | 8.5 |
|  |  | 100 | 10 | 13 | 8/16 | 23 |
| Control | (no polymer) |  | 3 | 10 | 7/10 | 56 |

The above data show substantially reduced fluid loss when the copolymer is present in the drilling mud as a waterloss control additive for both the KCL and the sea salt based muds.

While not to be bound by theory, the suspected mechanism by which the invention performs is believed to involve the copolymer's amine functionality which enables the copolymer to be adsorbed more effectively onto the clay particles. At the pH present in down hole conditions (normally greater than 8.5), polyacrylic acid-type copolymers alone do not adsorb properly and, therefore, do not perform as well as the hydrolyzed copolymers of this invention. This becomes evident when examining fluid loss characteristics of the drilling mud.

The copolymers which are used in the drilling mud compositions of our invention are at least 5% hydrolyzed and preferably at least 10% hydrolyzed on a mol basis. It is possible, as demonstrated by the data of Table 2, that the copolymers be hydrolyzed as much as 50% and even greater than 90%, to 99+or 100% hydrolyzed, from the N-vinylamide groups to N-vinylamines.

Hydrolysis with a base gives free amino groups whereas hydrolysis with an acid provides a corresponding polymer salt from which free amino groups can be obtained by addition of a base. The use of a mineral acid in the hydrolysis step or in acidifying the base hydrolysis product, provides the vinylamine salt of that acid. Sutiable acids for the hydrolysis include mineral acids such as hydrochloric, hydrobromic, sulfuric, phosphoric and perchloric acid. Organic acids can be used as well and monovalent acids are preferred. The bases which can be employed include the alkali and alkaline earth hydroxides, such as sodium hydroxide, potassium hydroxide, calcium hydroxide and barium hydroxide. Quarternary ammonium hydroxides, such as tetramethyl ammonium hydroxide, can also be used. The quantity of acid or base required can vary widely depending upon the degree of hydrolysis desired and the reaction conditions. Approximately 1 to 3 equivalents of the acid or base per equivalent of the polymer is preferred to achieve essentially complete hydrolysis. Equivalents of the polymer are based upon the N-vinylamide groups in the copolymer.

Hydrolysis can take place in various solvents such as water, liquid ammonia, or alcohols such as methanol or ethanol. Amines can also be used such as methylamine or dimethylamine or hydroxyamines such as ethanolamine. It is preferred, however, simply to add the acid or base dissolved in water to an aqueous solution or a water-in-oil emulsion of the copolymer.

The temperature of the hydrolysis can range from 20° to 200° C. depending upon the type of polymer and hydrolysis employed. Hydrolysis proceeds more rapidly with vinylformamide groups in the copolymer than if the vinylamide groups are derived from N-vinylacetamide. The preferred temperature range for base hydrolysis is 70° to 100° C., but the temperature for either acid or base hydrolysis of N-vinylacetamide groups in the copolymer could range from 110° to 200° C.

The drilling mud compositions for oil field applications contain an aqueous disperstion of clay containing an electrolyte such as, for example, sodium chloride or potassium chloride and a water soluble polymer to viscosify the slurry and control rheology. The term "clay" with regard to drilling mud compositions is meant to include any hydratable or colloidal clay useful in drilling mud, such as sepiolite, as well as more commonly used bentonite and attapulgite. The mud can also contain weighting agents, such as barite, iron oxide and siderite. A typical drilling mud can contaon 0.5 to about 5 wt % of the aqueous dispersion as clay, with from 0 to 10 wt % of electrolyte, such as NaCl or KCl. Viscosifiers can also be present to control rheology. these muds will typically have a pH of from 6 to 8 and the amount of copolymer present can vary from about 0.1 to about 1 wt %, although the optimum amount of copolymer can be determined by the extent of waterloss control required under the conditons of well drilling an the formations encountered. Such waterloss control is especially helpful when penetrating formations which contain calcium or magnesium ions which contaminate the drilling mud, particularly the bentonite muds.

The copolyme can contain from 10 to 95 mole % of the acrylamide and from 5 to 90 mole % of the N-vinylamide, preferably N-vinylformamide. Although the average molecular weight of the polymer can vary broadly, they perform best when prepared between $10^4$ and $10^6$ and such polymers are advantageously used whne at least 10% of the N-vinylamide units are hydrolyzed to the N-vinylamine units.

Additionally, the polymers made in accordance with this invention can contain up to about 25 mole % of a third comonomer, such as vinylacetate, hydrolyzed vinylalcohol, ethylene, styrenes, vinylethers, (meth)acrylic acid, (meth)acrylamide, maleic acid, fumeric acid, crotonic acid, and the like. Suthe third comonomers are typically substituted for acrylamide in the polymer structure.

STATEMENT OF INDUSTRIAL APPLICATION

The present invention provides an aqueous clay-based drilling mud which has improved waterloss control characteristics because of the presence as an additive of a hydrolyzed copolymer of an acrylamide and N-vinylamide. The use of this waterloss control additive in drilling wells for oil or gas permits a more consistent control of the characteristics of the drilling mud with improved removal of drill cuttings and preservation of the integrity of the bore hole.

We claim:

1. An aqueous clay-based drilling mud containing as a waterloss control additive a copolymer of acrylamide and an N-vinylamide, said copolymer having at least about 5 percent of the N-vinylamide units hydrolyzed to N-vinylamine units wherein said copolymer, before hydrolysis, contains from 10 to 95 mole percent acrylamide units and from 5 to 90 mole percent N-vinylformamide units.

2. The composition of claim 1 wherein said N-vinylamide has the formula:

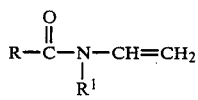

wherein R and R$^1$ are each selected from hydrogen or a C$_1$ to C$_4$ alkyl group.

3. The composition of claim 1 wherein said N-vinylamide is N-vinylformamide.

4. The composition of claim 3 wherein at least 10 percent of the N-vinylformamide units are hydrolyzed to N-vinylamine units.

5. The composition of claim 3 wherein said copolymer, before hydrolysis, contains 50 to 95 mole percent acrylamide units and 5 to 50 mole percent N-vinylformamide units.

6. The composition of claim 1 wherein said copolymer has an average molecular weight of at least 10$^6$ and at least 10 percent of the N-vinylamide units are hydrolyzed to N-vinylamine units.

7. The composition of claim 1 wherein a portion of said acrylamide is hydrolyzed.

8. The composition of claim 1 wherein said copolyme contains up to 25% of a third comonomer substituted for acrylamide, said comonomer selected from the group consisting of vinylacetate, hydrolyzed vinylalcohol, ethylene, styrenes, vinylethers, (meth)acrylic acid, (meth)acrylamides, maleic acid, fumeric acid and crotonic acid.

9. The composition of claim 8 in which said third comonomer is acrylic acid.

10. The composition of claim 9 in whcih said acrylic acid is derived from partial hydrolysis of the acrylamide.

11. A method of drilling a well using a cutting bit to penetrate an underground formation which comprises circulating to the bottom of the bore hole and to the ground surface an aqueous, clay-based drilling mud which contains as a waterloss control additive a copolymer of acrylamide and an N-vinylamide, said copolymer having at least 5 percent of the N-vinylamide units hydrolyzed to N-vinylamine units wherein said copolymer, before hydrolysis, contains from 10 to 95 mole percent acrylamide units and from 5 to 90 mole percent N-vinylformamide units.

12. The method of claim 11 wherein said N-vinylamide is N-vinylformamide.

13. The method of claim 12 wherein at least 10 percent of the N-vinylformamide units are hydrolyzed to N-vinylamine units.

14. The method of claim 11 wherein said clay is bentonite and said formation contains calcium or magnesium ions which contaminate the mud.

* * * * *